Sept. 15, 1970  O. J. JACOB  3,528,649
TORSION SPRING ATTACHMENT MEANS
Filed Nov. 28, 1967

INVENTOR.
Oliver J. Jacob
BY
W. F. Wagner
ATTORNEY

United States Patent Office 3,528,649
Patented Sept. 15, 1970

3,528,649
TORSION SPRING ATTACHMENT MEANS
Oliver J. Jacob, St. Clair Shores, Mich., assignor to General Motors Corporation, Detroit, Mich., a corporation of Delaware
Filed Nov. 28, 1967, Ser. No. 686,120
Int. Cl. B60g *11/18;* F16f *1/16*
U.S. Cl. 267—57                         6 Claims

ABSTRACT OF THE DISCLOSURE

A blade type torsion spring disposed in a complementary socket with a groove of semi-circular cross section formed therein containing a split pin formed with a compound curvature groove engaging surface and a flat spring engaging surface enabling the portion of the blade within the socket to deform helically upon torsional deflection of the portion of the spring external to the socket.

---

This invention relates to springs and more particularly to improved means for attaching and anchoring torsion springs of polygonal cross section.

In utilizing torsion springs for various purposes, numerous means for anchoring or attaching the free ends thereof have been devised in the prior art. However, in practical application in order to achieve optimum economy in utilization, it is desirable that such springs be susceptible to formation in which no special preparation of the extremities is required. Ideally, a spring of uniform polygonal cross section would be provided with an anchor having a socket formed therein adapted to slidably receive the extremity of the spring. However, in such arrangements, some of the benefits inherent in utilizing the torsional elasticity are offset due to the fact that twisting imparted to the spring is abruptly resisted at the face of the anchor where the spring enters the socket. Such disruption of smooth transition of flexing induces stress concentrations which tend to cause premature fatigue failure. The present invention is concerned primarily with improving the performance and service life of torsion spring assemblies utilizing springs of polygonal cross section and particularly with reference to the so-called blade type torsion spring, which term, as used herein, is intended to denote single springs of rectangular cross section as well as a plurality or laminated arrangement of such springs.

An object of the invention is to provide an improved torsion spring assembly.

Another object is to provide improved means for anchoring and otherwise operatively connecting opposite ends of blade type trosion springs to associated elements.

A further object is to provide an anchor for a blade type torsion spring which enables the spring to exhibit smooth transition in torsional deflection throughout its entire length, including the portion within the anchor.

The foregoing and other objects, advantages and features of the invention will become more readily apparent as reference is had to the accompanying drawing wherein.

Figure 1:
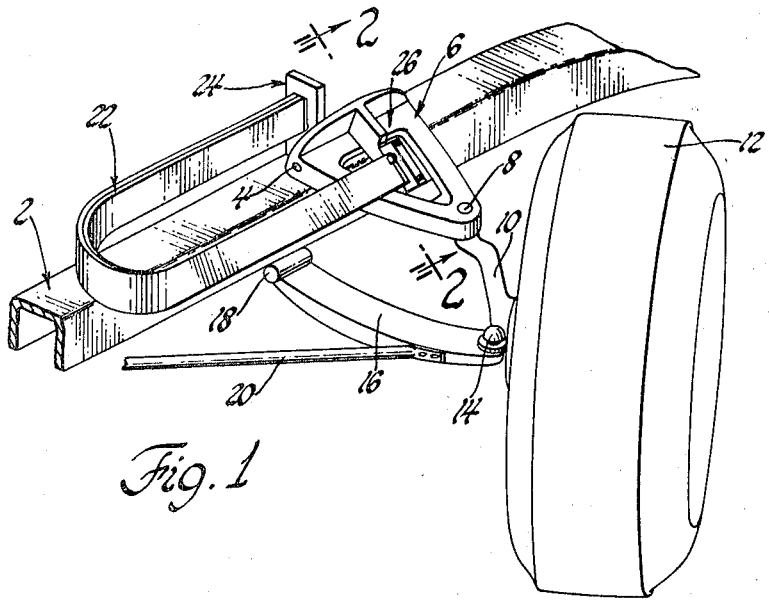
FIG. 1 is a fragmentary perspective view of a vehicle suspension assembly incorporating the invention.

Referring now to the drawing and particularly FIG. 1, there is shown a dirigible wheel suspension assembly for a vehicle in which the reference numeral 2 generally designates a frame side rail member. Pivotally mounted on the upper surface of side rail 2 on a generally longitudinally extending axis 4 is an A-frame type upper control arm 6. At its outer end, control arm 6 is universally pivotally connected at 8 to the upper end of a steering knuckle assembly 10. Intermediate its upper and lower ends, steering knuckle 10 has rotatably mounted thereon a dirigible road wheel 12. At its lower end, knuckle 10 is universally pivotally connected at 14 to the outer end of a transversely extending beam type lower control arm 16. At its inner end, beam type lower control arm 16 is pivotally mounted to frame side rail 2 on a generally longitudinally extending axis 18. To impart fore and aft stability to arm 16, a generally diagonally arranged strut rod 20 extends between the outer end of arm 16 and a suitable flexible universal connection, not shown, mounted on side rail 2.

To elastically support side rail 2 and the associated vehicle superstructure, not shown, relative to wheel 12, a generally U-shaped laminated blade type torsion spring 22 is ararnged between a first anchor member 24 on side rail 2 and a second anchor member 26 mounted on the upper surface of control arm 6.

Figure 2:
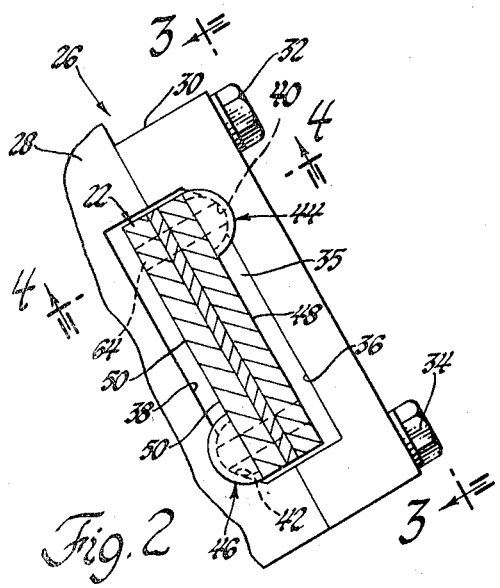
FIG. 2 is a partly sectioned view looking in the direction of arrows 2—2 of FIG. 1, illustrating the details of construction of a blade spring and anchor assembly in accordance with the invention.
Figure 3:
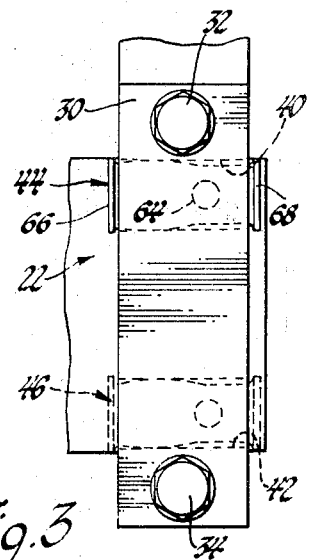
FIG. 3 is a view looking in the direction of arrows 3—3 of FIG. 2.

In order to accomplish optimum service life and freedom from fatigue failure in accordance with the present invention, the opposite extremities of spring 22 are connected to the respective anchor members in a manner enabling the portions of the spring within each of the anchors to exhibit helical deformation consistent with the degree of torsional deflection imparted to the entire spring during rising and falling movement of the wheel relative to the frame. To this end, as seen best in FIG. 2, the anchor member 26 (which for the purposes of the following description may be considered identical to anchor 24) comprises a first portion 28 affixed to the control arm and a mating portion 30 which is attached thereto by bolts 32 and 34. Portions 28 and 30 are initially formed to provide a longitudinally facing aperture 35 of generally rectangular cross section, the dimensions of which are substantially greater than the dimensions of the spring portion disposed therein. At diametrically opposite sides of aperture 35, the faces 36 and 38, respectively, are provided with parallel longitudinally extending slots 40 and 42 which exhibit uniform semi-circular cross section throughout their longitudinal extent. Disposed in each slot 40 and 42 are identical split pin bearing elements 44 and 46 which, according to the principal feature of the invention, are contoured to provide continuous precision bearing contact with the adjacent spring surfaces 48 and 50 and the semi-circular surfaces of slots 40 and 42 irrespective of change in angular relation between said surfaces which arise as an incidence of torsional deflection of the spring.

Figure 4:
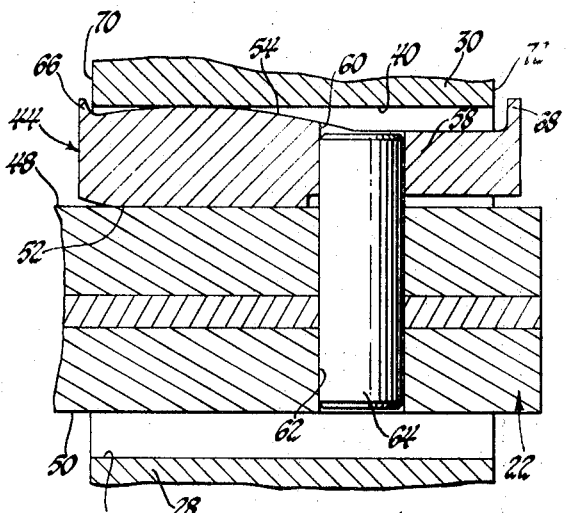
FIG. 4 is a greatly enlarged sectional view looking in the direction of arrows 4—4 of FIG. 2.
Figure 5:
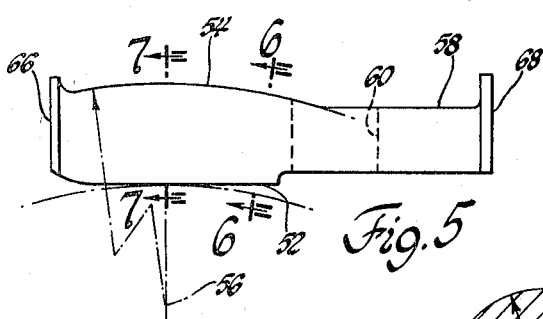
FIG. 5 is a side elevational view of the split pin bearing element utilized in the invention.
Figures 6, 7:
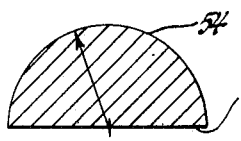
FIG. 6 is a sectional end elevation looking in the direction of arrows 6—6 of FIG. 5.
FIG. 7 is a sectional end elevation looking in the direction of arrows 7—7 of FIG. 5.

As seen best in FIG. 4, pin 44 (which for the purposes of the following description is identical to pin 46) is formed with a forward portion having a flat lower surface 52 which abuttingly engages the upper surface 48 of spring 22. As seen best in FIGS. 6 and 7, the upper surface 54 of pin 44 in turn is curved in transverse section so as to provide a uniform radius of curvature throughout its entire longitudinal extent which corresponds precisely to the transverse radius of curvature of slot 40. Additionally, as seen in FIG. 5, the upper surface 54 is also curved in longitudinal section about a transverse axis 56 so that line contact is maintained between the respective transverse curvatures of pin 44 and slot 40 irrespective of whether the surface 48 remains parallel with slot 40. Thus, when the plane of surface 48 of spring 22 departs from parallelism with the plane defined by the base of the slot 40, the angular change imparted to pin 44 causes the outer surface 54 thereof to rotate along the slot 40 and establish a new longitudinal position of transverse line of contact therewith. Since each transverse section taken through the forward portion of pin 44 has the same radius of curvature, such migrating line contact exhibits uniform precision engagement with the slot irrespective of the shifting angular relationship of the portion of spring 22 within the socket.

In order to maintain the spring and anchor in assembled relation for operation in the manner described, the pin 44 includes a shank portion 58 having an aperture 60 formed therein in registration with a corresponding aperture 62 formed in the spring 22. A suitable dowel pin 64 extends completely through both apertures to key the pin 44 to the spring 22. Additionally, the pin 44 is provided at its opposite longitudinal extremities with flanges 66 and 68, the outer perimeters of which overlap the end faces 70 and 72 of the anchor portion 30, thus preventing withdrawal of the spring assembly from the anchor even when the spring is in a completely relaxed condition.

From the foregoing, it will be seen that a novel and improved anchor assembly has been provided in which bearing elements of compound curvature accommodate helical deflection of the portion of the spring within the anchor and thus eliminate the abrupt transition typical of prior art constructions which normally gave rise to premature fatigue failure.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. In combination, a torsion spring of polygonal cross section, an anchor member having a socket formed therein surrounding one end of said spring in spaced relation thereto, means forming a groove of semi-circular cross section in said socket extending parallel with but offset from the torsional axis of said spring, a bearing member disposed in said groove, said bearing member having an inner flat surface engaging said spring and an outer surface of curved cross section conforming with the cross-sectional curvature of said groove, said outer surface also being curved in longitudinal section so that precision line contact is maintained between said surface and said groove throughout a range of change in angular relation between the longitudinal axis of said groove and the surface of said spring within said socket.

2. The invention of claim 1 wherein the curvature in longitudinal section defines a circular arc.

3. The invention of claim 1 wherein said bearing member includes a shank portion spaced from said groove and including means for retaining said bearing member in a fixed position relative to said spring.

4. The invention of claim 3 wherein said means comprises registered apertures in said bearing shank and said spring having a dowel pin extending therethrough.

5. The invention of claim 4 including flange portions at opposite ends of said bearing member overlapping longitudinal opposite faces of said anchor member.

6. The invention of claim 5 wherein said socket is formed with diametrically opposite grooves as defined and a pair of bearing members as defined engaging diametrically opposite surfaces of said spring.

References Cited

UNITED STATES PATENTS 3,339,909  9/1967  Hanslip et al. _____ 267—57

JAMES B. MARBERT, Primary Examiner